UNITED STATES PATENT OFFICE.

HARLEY J. MORRISON, OF CINCINNATI, OHIO, ASSIGNOR, BY MESNE ASSIGNMENTS, TO THE HYDROGENATION COMPANY, OF CINCINNATI, OHIO, A CORPORATION OF OHIO.

PROCESS OF REVIVIFYING CATALYSTS.

1,203,233.  Specification of Letters Patent.  Patented Oct. 31, 1916.

No Drawing.  Application filed June 12, 1914.  Serial No. 844,807.

*To all whom it may concern:*

Be it known that I, HARLEY J. MORRISON, a citizen of the United States, and a resident of the city of Cincinnati, in the county of Hamilton and State of Ohio, have invented certain new and useful Improvements in the Process of Revivifying Catalysts, of which the following is a specification.

Great difficulty is experienced in revivifying metallic catalysts, either wholly metallic or on an inert support, which have been "spent" or become inactive in the hydrogenation of fats, oils and the like. The most direct way is to dissolve out the fats, etc., with a suitable solvent, then reduce in an atmosphere of hydrogen at a suitable temperature. It has been found, however, that there is much organic matter present, which is not soluble in any of the ordinary commercial solvents, and when it has been sought to burn out this organic matter difficulties arise. If a reducing temperature or temperature below the point of ignition in the air is employed, the material is apt to char, leaving a great deal of carbon in the material. If the material is heated in an oxidizing atmosphere and at a temperature which will burn out all the organic matter, it is found that it is not catalytically active when reduced in hydrogen. Further it is very difficult to burn out completely a light pulverulent material without frequent turning over, to expose the unburned portion to the air. In turning it over, it dusts easily, entailing losses, if means are not provided to catch it by precipitation of some sort, and return it to the heating zone, to which point it must be brought because it will always contain considerable carbon from the soot formed by the organic matter. To overcome these difficulties, I have discovered, that if the material as it comes from the filtering or settling apparatus, either after being extracted with a suitable solvent or direct, containing all the oil and organic matter, is subjected to pressure, preferably in a hydraulic press, at about 2000 pounds per square inch, it will extract much of the oil of the unextracted material. It will form cakes or briquets of either, which can be readily and completely burned out, without turning over to expose it to the air, as the lumps allow a free circulation of air. After the material is sufficiently burned (a small per cent. of carbon does not interfere), it is macerated with water and sufficient acid, preferably a mineral acid, is added to dissolve all the metallic portion. This is done preferably in a suitable vessel which contains a mechanical agitator or other device to keep the material in suspension. When the metal or oxid is dissolved and still while agitating, the metal salt is precipitated as a hydrate or carbonate by any of the well known reagents. I prefer sodium carbonate. It is now washed practically free of any soluble salts which would interfere with its activity, *i. e.* salts which would act as "poisons" either before or after reducing, such as sodium sulfid or sodium sulfate. I prefer a washing filter press for this purpose. It is now dried, ground and reduced in an atmosphere of hydrogen. It will now be found to have regained its original activity.

Having thus described my invention, what I claim as new and desire to secure by Letters Patent, is:—

1. The hereindescribed process of regenerating metalliferous catalysts which have served for the hydrogenation of fats and oils, which consists in subjecting the spent material containing the catalyst to pressure sufficient to express the bulk of the fatty material and to form the residue into a coherent cake or briquet, burning out residual organic matter from the said briquet, and recovering the metal therefrom in catalytically active form.

2. In a process of regenerating metalliferous catalysts which have served for the hydrogenation of fats and oils, the steps which consist in subjecting the spent material containing the catalyst to pressure sufficient to express the bulk of the fatty material and to form the residue into a coherent cake or briquet, and burning out residual organic matter from the said briquet.

HARLEY J. MORRISON.

Attest:
  EARL W. GRIFFIN,
  ANNA F. DIENST.